United States Patent [19]

Pedone, Jr. et al.

[11] B 3,987,939

[45] Oct. 26, 1976

[54] CAULKING GUN CARTRIDGE LATCH

[75] Inventors: Michael Joseph Pedone, Jr., Towson; Hanspeter Ehrenfried Beisch, Belair, both of Md.

[73] Assignee: The Black and Decker Manufacturing Company, Towson, Md.

[22] Filed: Oct. 16, 1974

[21] Appl. No.: 515,303

[44] Published under the second Trial Voluntary Protest Program on January 20, 1976 as document No. B 515,303.

[52] U.S. Cl. .......... 222/325

[51] Int. Cl.$^2$ .......... G01F 15/00

[58] Field of Search .......... 222/325–327; 215/279; 285/305, 321; 220/319, 320, 324

[56] References Cited

UNITED STATES PATENTS

| | | | |
|---|---|---|---|
| 2,607,627 | 8/1952 | Gregg et al. | 222/325 |
| 3,315,990 | 8/1967 | Kramer | 285/321 X |
| 3,389,838 | 6/1968 | Morra et al. | 222/326 X |
| 3,568,892 | 3/1971 | Burk | 222/327 |

FOREIGN PATENTS OR APPLICATIONS

| | | | |
|---|---|---|---|
| 133,080 | 8/1902 | Germany | 215/279 |

*Primary Examiner*—Stanley H. Tollberg
*Assistant Examiner*—Norman L. Stack, Jr.
*Attorney, Agent, or Firm*—William Kovensky; Joseph R. Slotnik; Edward D. Murphy

[57] ABSTRACT

A front loading caulking gun comprising a tube which is open for 90° of its periphery having a latch pivoted at its front end which swings completely out of the way to allow cartridge insertion and removal. It is latched into holes in the sides of the tube to hold the cartridge against the dispersing pressure. The wavy spring metal latch contacts several points around the metal bead at the front end of the cartridge to prevent cocking and to hold the cartridge snugly in the device until the latch is undone.

10 Claims, 4 Drawing Figures

CAULKING GUN CARTRIDGE LATCH

Figure 1:
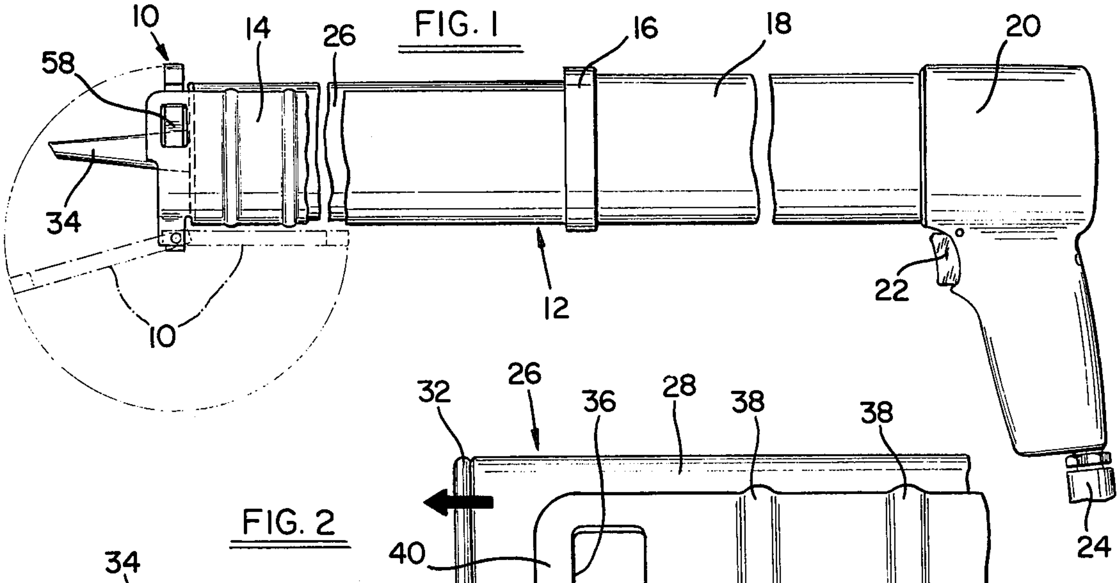

This invention pertains to a latch, and more in particular latch for use at the front end of a tube. Still more particularly, the invention latch is particularly adapted to hold a cartridge or the like in a caulking gun.

Many materials are presently sold packed in disposable cartridges from which they are extruded by a gun adapted to accept the cartridge. Examples of such materials are various adhesives, caulking and sealing materials of many different kinds, and various other kinds of extrudable materials. Such cartridges are well known. They basically comprise a tube formed of coated cardboard, which is filled with the material to be extruded. One end of the tube is open and is fitted with a plunger member which is separate from the tube and which is adapted to be pushed through the tube to extrude the material from the opposite end. That opposite end is fitted with a metal closure member having an integral nozzle. Inside the nozzle is a seal. To dispense or extrude the material, the user first snips off the end of the integral nozzle at a point which will produce a desired bead thickness. The user then punctures the seal through the now open nozzle, and he is then ready to extrude the material. After all the material is extruded, the tube and nozzle, with the plunger now at the front end against the closure member, is simply discarded, and another filled cartridge is inserted into the caulking gun or other dispensing device. Such caulking guns range from very inexpensive manually operated devices, to sophisticated pneumatically and electrically driven devices, all of which are intended to be used with the same disposable cartridges.

The present invention comprises means to hold all such cartridges in all such caulking guns, that is, the invention is the front end of a caulking gun and is amenable to use on both manual caulking guns and power caulking guns of all sorts, so long as the gun uses these conventional cartridges. As is clear, the specific contents of such cartridges is unimportant to the invention.

More specifically, the invention front end comprises an open tube, that is a tube open for a portion of its periphery and along its entire length, in combination with an improved front end latch to hold a cartridge while the material in the cartridge is being dispensed. The open or split tube lends important advantages in combination with the present invention latch. Among these are that it is easier and cheaper to manufacture, the open tube can be rolled from a flat stamping, lighter in weight, permits rotation of the cartridge as required during use such as would be engendered by changing a partially used cartridge, and making full use of the sealed cartridge itself. Another advantage is that the printing etc. on the cartridge can be read while the cartridge is in the gun. Perhaps most importantly, the open tube permits cleaning of the caulk guns in which it is used in the event of a cartridge failure. A burst or split cartridge would create a mess which would be very difficult to clean up in a closed cartridge tube. The open tube simplifies clean up. Finally, the open tube cooperates with and facilitates the use of the invention latch.

Another advantage of the 90° open barrel is that it facilitates handling of the cartridge without touching the material dispensing nozzle which is often very messy and undesirable to handle because of the presence of caulk or the like on the nozzle. The open tube allows the user to handle the cartridge without touching the nozzle by using fingers or thumb through the opening to push the cartridge forwardly enough that the clean tube part of the cartridge may be dropped forwardly of the latch.

Thus, the invention permits front end loading and unloading of cartridges in a caulk gun. Such structure is not usual in caulk guns presently commercially available, although they are known in the prior art. Front end loading produces a number of advantages, including the ability to push the plunger back in power operated caulk guns with the fresh cartridge itself. Another advantage is that the caulk cartridge handling part of the gun can be completely separate from and need not be handled by the operator when changing tubes, as set forth above.

The latch of the invention provides support all around the metal front end plate of the caulk tube when it is in place in the gun. This feature prevents the tube from cocking in use which would cause serious problems. At the same time, the invention latch overlays a very small portion of the front end plate, thereby making the latch quick and easy to operate, and minimizing the interference area between latch and cartridge. This minimization is desirable because it reduces the area in which an operator can pinch his fingers. Further, even if the operator should pinch his fingers, the injury is minimized because of this small interference area. Yet another advantage of the invention front end latch is that it is attached to and swings from the open cartridge supporting tube. Thus, the invention includes no loose pieces in a caulk gun. Such loose pieces, which may be found in prior art caulk guns can get lost and thus reduce the useability and the advantageousness of such guns. Because cartridges can be changed quickly, important labor saving economies are achieved by this invention, particularly in commercial and industrial use.

The invention has utility beyond its use as a front end of a caulk gun as shown in the drawing. For example, the invention tube and latch could be used in various kinds of dispensing apparatuses. With a vertically disposed tube of predetermined length, a predetermined number of baseballs or tennis balls or the like could be stored and held by the invention latch, and then this predetermined mumber dispensed upon opening of the latch. The step of releasing the latch could be done automatically or manually. Such an application might be found in various kinds of automated machinery, such as baseball pitching machines or tennis ball lobbing machines. In the above and in the following uses, the tube to be closed off might or might not be partly open. That is, a closed tube could be used in the invention by the simple expedient of forming notches and ears or whatever is necessary to twist and secure the latch to such a conventional closed tube. With the latch suitably re-configured, the invention could be used to dispense disposable paper or plastic cups or the like. The tube could be loaded from the bottom end by opening the latch, and then the cups dispensed one at a time by suitable interaction between the re-configured latch and the beads of the cups. Generally, the invention can be adapted to retain and/or dispense many articles, such as drill bits, or screwdrivers, or the like loaded in a tube.

Figure 2:
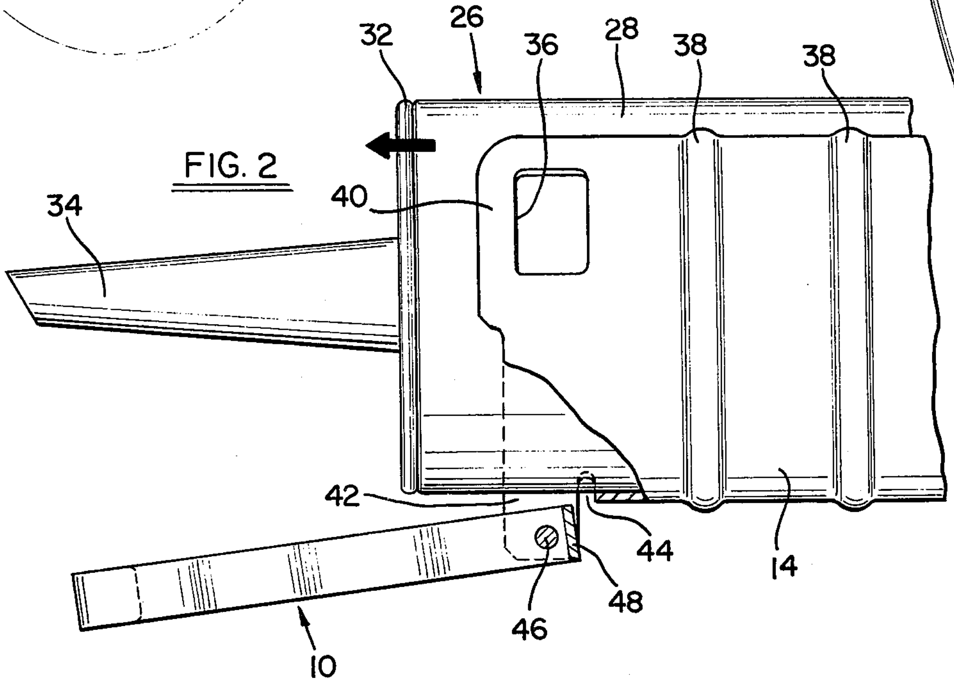
Figure 3:
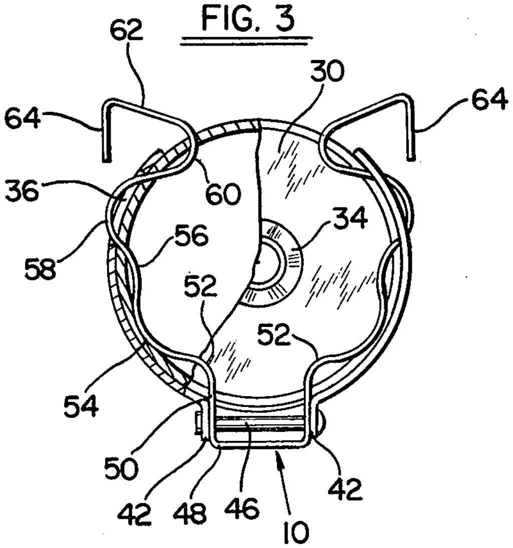

The above and other advantages of the invention will be pointed out or will become evident in the following detailed description and claims, and in the accompanying drawings also forming a part of the disclosure in which FIG. 1 is an elevational view of the invention latch and tube as embodied in a power caulking gun; FIG. 2 is an enlarged view of the invention front end showing the caulk cartridge partly removed; FIG. 3 is a front elevational view, partly in section, showing the invention in a latch position; and FIG. 4 is a view similar to FIG. 3 showing the latch squeezed to an unlatch position and ready to be swung out of the way to allow cartridge removal.

Referring now in detail to the drawings, in FIG. 1 there is shown a caulking gun 12 having a latch 10 mounted in the front end of cartridge retaining means, preferably a tube 14. The tube 14 shown is preferred because of its ease of manufacture and relatively low cost. However, other functionally equivalent means, such as a grid work, or a plurality of bars, or the like could be substituted, so long as the function of locating the latch 10 at a pre-determined distance from the remainder of the caulking gun 12 is fulfilled. In other environments the retaining means and latch would take other forms. For example, it might be desired to hold some square, rectangular, triangular, oval, or other cross-sectional shaped item(s) in a similarly configured retainer. The word "channel" as used in the specification and claims herein therefore shall be understood to include all such retaining devices, of whatever shape, partly open or closed, perforate or solid, and the like structure amenable to use in the invention. All remaining portions of the caulk gun 12 are incidental and form only the environment of the invention. That is, the invention front end can be used with various caulking guns as well as in other applications as set forth above and as will present themselves to those skilled in various arts in which the invention may be used. The rear end of the cartridge tube 14 is joined by any suitable joining means 16 to the front end of a power cylinder tube 18. The rear end of tube 18 is connected to a power handle 20 having an operating trigger 22 and a supply means 24, which may be an electrical wire, or which may be a conduit for pressurized air in the case of a pneumatic tool.

A conventional cartridge for caulk, adhesives, or like materials, is shown latched in position in FIG. 1, and is shown unlatched and partially removed in FIG. 2. Cartridge 26 comprises a main body 28 formed of paper, cardboard or the like treated material, a front end 30 (see FIGS. 3 and 4), and a bead 32 joining the body 28 to the metal cover plate 30. An integral nozzle 34 usually formed of a suitable plastic, is joined at the center of the front plate 30. The nozzle is shown cut at an angle as it would typically be used. The catridge 26 is wholly conventional, does not per se form a material part of the invention, and need not be described any further herein. The other other characteristic of the cartridge 26 which is important for the operation of the invention is its length between its inner end (not shown) and the end of the bead 32, which length must be pre-determined and less than the distance between the joining means 16 and the latch in the latched position as shown in FIG. 1. That is, the cartridge must fit in and be shorter than the space provided to receive it in the tube 14.

Figure 4:
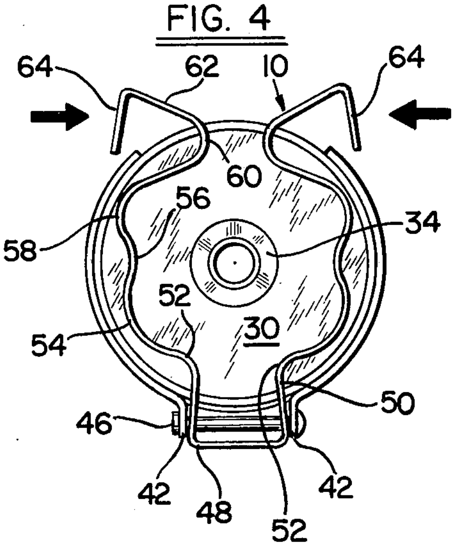

The tube or barrel 14 is open for approximately 90° at its top side, as can be best seen in FIGS. 3 and 4. In other environments, the invention could be used with other parts of tubes, channels, and the like, so long as the front end is suitably formed for cooperation with the latch 10, as will be set forth below.

The front end of the tube 14 is provided with a pair of ribs 38 for the purpose of stiffening the tube at the otherwise unsupported front end. The ribs 38 have been omitted from FIGS. 3 and 4 for the sake of clarity. Forwardly of ribs 38 the tube 14 is formed with a pair of rectangular latching openings 36. With other latch shapes, a single opening 36 may be sufficient. Forwardly of these openings 36 the tube 14 comprises a pair of forwardly extending tabs 40 which serve to strengthen the tube in the vicinity of the openings 36. The bottom of the front end of the tube 14 is cut out to form a pair of downwardly extending parallel ears 42. A cutout 44 facilitates the formation of the earss 42. A rivet 46 is provided and secured in the ears 42 as a pivot to swingably mount the latch 10 in place thereon.

Latch 10 is formed from a single flat piece of spring steel or the like material, and comprises the various portions which serve specific functions, described below. The latch 10 is symmetrical about a vertical line containing the axis of the cartridge 26, that is, about a vertical line through the center of FIGS. 3 and 4. The latch being symmetrical, only one side will be described portion by portion, it being understood that the other side has similar portions symmetrically arranged. Latch 10 comprises a base portion 48 having a leg portion extending up from each end thereof. From the upper or inner ends of the leg portions 50, the bulk of the latch 10 comprises a series of smoothly blended and alternately curved portions. These comprise a first inwardly curved portion 52, a first outwardly curved portion 54, a second inwardly curved portion 56, a second outwardly curved portion 58, and finally a third inwardly curved portion 60. Beyond curved portion 60, the latch comprises suitable manually operating means, comprising a flat sloped portion 62, and the latch is finally terminated by a handle portion 64 downwardly extending from the outer end of the flat portion 62.

The second outwardly curved portion 58 is enlarged as compared to all of the other curved portions, and this portion 58 cooperates with the rectangular holes 36 to lock the latch in the cartridge retaining position as shown in FIGS. 1 and 3. As is readily apparent from a comparison of FIGS. 3 and 4, the arrows in FIG. 4 indicating the pressure applied by the user's fingers, the latch is unlatched by squeezing the handle portions 64 towards each other, which causes the latch halves to pivot at the leg portions 50 and at the joints between the leg portions 50 and the center base portion 48. Once the latch is squeezed together and released from its cooperation with the holes 36 and all other portions of the tube 14, it can be readily swung down into the FIG. 2 position, or into any of the other positions indicated by the dot-dash line in FIG. 1. At this time, the latch is completely free of the cartridge, as shown in FIG. 2, whereby the cartridge can be removed or replaced into the front end of the cartridge retaining tube 14. As is best shown in FIG. 3, the latch retains the cartridge 26 by cooperation between all of the curved portions 52 through 60, with the exception of the enlarged portion 58 which is positioned in the holes 36, against the bead 32 and the front end plate of the cartridge 30. In this manner, the cartridge is uniformly supported around substantially its entire periphery, with the exception of the unsupported portions between the open ends of the curved portions 60 corresponding to the base portion 48. Further, the interference or the amount of contact between the latch portions and the bead 32 is very small, which is an advantage for purposes of minimizing the area in which the user can pinch his fingers, while at the same time providing a quick disengagement action as shown in FIG. 4. That is, the amount of motion required to unlatch the latch is not great, thus facilitating the speed with which the latch can be undone and the cartridge removed. This is particularly important in commercial caulking as in industry and in construction, in that in such applications a craftsman can use as many as 50 cartridges during a single day's work, a usage of 30 cartridges being common. Thus, the advantages of the quick latching and unlatching of the invention is manifest in that prior devices which involve screw threads or other cumbersome means are highly disadvantageous in that large amounts of time are needed for their operation, and a great deal of worker fatique is engendered. In the present invention, the workman can very quickly and easily change cartridges with virtually no effort. Another feature of the invention manifest from the above is that there are no loose pieces. The invention is a very simple straightforward spring retainer, which is pivotally but permanently connected to the tube 14 via the ears 42 and the pivot rivet 46. Thus, the disadvantages of prior devices wherein separate parts can get lost is totally eliminated in the present invention. There are no separate parts.

While the invention has been described in detail above, it is to be understood that this detailed description is by way of example only, and the protection granted is to be limited only within the spirit of the invention and the scope of the following claims.

We claim:

1. A portable, power-operated cartridge dispensing device comprising a housing having a dependent handle and a power cylinder tube extending forwardly thereof, an elongated cartridge retaining tube extending forwardly of said power cylinder tube and having an open front end for free insertion and removal of a cartridge, an integral latch member pivoted by fixed pivot means on the front end of said cartridge retaining tube and outside its confines, said latch member being pivotable from a first position obstructing said open front end of said cartridge retaining tube wherein a cartridge in said retaining tube is prevented from moving out the front end thereof, to a second position clear of said cartridge retaining tube front end wherein the cartridge may be withdrawn from or inserted in said cartridge retaining tube through its open front end, said latch member and said cartridge retaining tube having cooperable interlocking portions releasably holding said latch member in its first position.

2. A portable, power-operated cartridge dispensing device comprising a housing having a dependent handle and a power cylinder tube extending forwardly thereof, an elongated cartridge retaining tube extending forwardly of said power cylinder tube and having an open front end for free insertion and removal of a cartridge, a latch pivoted by fixed pivot means on the front end of said cartridge retaining tube and outside its confines, said latch being pivotable from a first position obstructing said open front end of said cartridge retaining tube wherein a cartridge in said retaining tube is prevented from moving out the front end thereof, to a second position clear of said cartridge retaining tube front end wherein a cartridge may be withdrawn from or inserted in said retaining tube through its open front end, said latch having resilient means releasably interlocking with said cartridge retaining tube to releasably hold said latch in its first position.

3. A portable, power-operated cartridge dispensing device comprising a housing having a dependent handle and a power cylinder tube extending forwardly thereof, an elongated cartridge retaining tube extending forwardly of said power cylinder tube and having an open front end for free insertion and removal of a cartridge, a one-piece latch member constructed of spring metal pivoted by fixed pivot means on the front end of said cartridge retaining tube and outside its confines, said latch member being pivotable from a first position where portions thereof obstruct the open front end of said retaining tube wherein a cartridge in said retaining tube is prevented from moving out the front end thereof, to a second position completely clear of said retaining tube front end wherein the cartridge may be withdrawn from or inserted in said retaining tube through its open front end, said latch member having a portion which is deflectable upon engagement with said retaining tube front end when said latch member is moved to its first position, said deflectable portion of said latch member releasably interlocking with said cartridge retaining tube to releasably retain said latch member in said first position.

4. In a device for dispensing the contents of a cartridge, said cartridge comprising an elongated body and an integral nozzle at the front end thereof, the impovement comprising elongated cartridge retaining means having an open front end adapted to freely receive said cartridge, a one-piece latch member pivoted by fixed pivot means on the front end of and outside the confines of said retaining means, said latch member being pivotable about an axis transverse to the length of said retaining means from a first position obstructing said open front end of said retaining means wherein the cartridge in said retaining means is prevented from moving out the front end thereof, to a second position clear of said retaining means front end wherein a cartridge may be withdrawn from or inserted in said retaining means through its open front end, said latch member and said retaining means having cooperable interlocking portions releasably holding said latch member in its first position.

5. The combination of claim 4, said latch member comprising a single piece of flat spring metal symmetrical about a diameter line of said retaining means perpendicular to said pivot axis, said latch comprising manual operating means located out of said path of motion and on the opposite side of the axis of said retaining means from said pivot axis, and said latch comprising a plurality of curved portions positioned inside said retaining means and adapted to contact the periphery of said cartridge front end to block the exit of said cartridge from said retaining means in said latched condition.

6. The combination of claim 4 wherein said latch member comprises a formed single piece of flat spring metal, and said latch member having handle portions at the ends of said flat spring metal piece disposed generally perpendicular to said pivot axis between said latch member and said retaining means.

7. The combination of claim 4 wherein said interlocking portions include at least one curved portion on said latch member extending outwardly from the inside of said retaining means and at least one opening formed in said retaining means and receiving said latch member portion to thereby hold said latch member in said first position.

8. The combination of claim 7 wherein said latch member includes a pair of symmetrically disposed outwardly extending curved portions, and wherein said retaining means includes a pair of opposed openings receiving said curve portions of said latch member.

9. The combination of claim 4, said retaining means comprising a tube member, a pair of outwardly extending parallel disposed ears on said tube member, said latch member comprising a base portion and a pair of legs extending inwardly from said base portion, said legs being in juxtaposed relationship to said ears, and said pivot axis comprising a rivet mounted in said juxtaposed ears and legs.

10. The combination of claim 4, and said cartridge retaining means comprising a tube open for approximately 90° of its periphery and through its entire length.

* * * * *